UNITED STATES PATENT OFFICE.

JAMES E. WRIGHT, OF NEW YORK, N. Y.

REMEDY FOR DYSPEPSIA.

SPECIFICATION forming part of Letters Patent No. 314,212, dated March 17, 1885.

Application filed March 28, 1884. (Specimens.)

*To all whom it may concern:*

Be it known that I, JAMES E. WRIGHT, a citizen of the United States, residing at the city of New York, county and State of New York, have invented a new and useful composition of matter to be used for the treatment of dyspepsia and indigestion and the various nervous troubles arising therefrom, and to be used for aiding the assimilation of food by convalescents, of which composition the following is a specification.

My composition consists of the following ingredients, combined in the proportions stated, viz: aletrin, thirty-six grains; hydrastin, thirty-six grains; oil of xanthoxylum, eighteen drops; lupulin, seventy-two grains; gum-acacia, eight grains; extract of gentian, four grains. These ingredients are to be thoroughly mixed by compounding, and to be divided into thirty-six wafers. These wafers are to be of a circular shape, and marked on one or both sides by a cross dividing the same into four equal parts, whereby small particles can be had for children of various ages.

In using the above-named composition, one wafer is to be taken after each meal by adults, a half of a wafer by children of fifteen years, and a quarter of a wafer by children under seven years.

By the use of the above composition, the flow of the gastric juice is increased, the mucus and muscular tissues are invigorated, the exalted sensibility of the nervous system is relieved, the secretions are aroused, and the capillary circulation quickened.

What I claim, and desire to secure by Letters Patent of the United States, is—

The herein-described composition of matter to be used for treatment of dyspepsia and the various nervous troubles arising therefrom, and for aiding the assimilation of food by convalescents, consisting of aletrin, hydrastin, oil of xanthoxylum, lupulin, gum-acacia, and extract of gentian, in the proportions specified.

JAMES E. WRIGHT.

Witnesses:
T. FRANCIS GIBBONS,
JAMES D. MERRITT.